United States Patent [19]

Kearns

[11] Patent Number: 5,454,505
[45] Date of Patent: Oct. 3, 1995

[54] WAVE SOLDER PALLET

[75] Inventor: Phillip A. Kearns, Tischmills, Wis.

[73] Assignee: Paragon Electric Company, Inc., Two Rivers, Wis.

[21] Appl. No.: 312,296

[22] Filed: Sep. 26, 1994

[51] Int. Cl.⁶ ..................................................... B23K 3/00
[52] U.S. Cl. ............................................ 228/39; 118/406
[58] Field of Search ........................... 228/39, 49.5, 214, 228/215, 254; 118/406

[56] References Cited

U.S. PATENT DOCUMENTS

| | | | |
|---|---|---|---|
| 2,964,007 | 12/1960 | Buffington | 228/39 |
| 4,412,641 | 11/1983 | Fuchs et al. | 228/37 |
| 4,421,265 | 12/1983 | Boyer et al. | 228/39 |
| 4,506,820 | 3/1985 | Brucker | 228/39 |
| 4,739,919 | 4/1988 | Van Den Brekel et al. | 228/39 |

*Primary Examiner*—Samuel M. Heinrich
*Attorney, Agent, or Firm*—Foley & Lardner

[57] ABSTRACT

An apparatus for facilitating wave solder treatment and other handling of a circuit component during manufacture of the circuit component having first areas configured for wave solder treatment and second areas not configured for wave solder treatment. The apparatus comprises a substantially rigid frame generally symmetrical about a plane and defining an opening which traverses the frame intermediate a first side and a second side. The apparatus further comprises a masking member affixed to the frame and defining a plurality of apertures traversing the masking member to the opening in the frame. The apparatus also comprises a holding device for holding the circuit component in an operational location in fixed relation with the masking member and with the frame during wave solder treatment. Each of the first areas of the circuit component is substantially in register with an aperture of the masking member when the circuit component is in the operational location. Particular walls about the apertures have a ramp for affecting solder flow during wave solder treatment.

18 Claims, 2 Drawing Sheets

5,454,505

WAVE SOLDER PALLET

BACKGROUND OF THE INVENTION

In the process of manufacturing semiconductor devices, one technique for effecting solder attachment of components to printed circuit board substrates is wave soldering. In wave soldering, an array of elements comprising a plurality of printed circuit boards not yet separated into individual parts is conveyed past a reservoir of solder. The array of elements is passed sufficiently close to the solder so that the solder may contact the portions of the elements which are to be solder-connected.

It is known to process a plurality of printed circuit boards simultaneously, passing them through a wave solder apparatus while maintaining them in a pallet or other holding device. Problems have arisen and been addressed in prior art disclosures, for example, regarding the consistency of solder thickness when it is applied by such processes using such apparata. The relationship between relative velocity of the solder in the wave solder reservoir with respect to the elements to be soldered affects the thickness of the solder connection which results from such processing.

It would be useful to have a pallet or other holding apparatus for processing a plurality of electronic parts through various processing steps including wave solder treatment of the parts. It would also be useful to have such a pallet or other holding device which holds the parts sufficiently accurately to facilitate automatic component insertion in printed circuit board substrates, and to facilitate automatic testing, including testing on such devices as a "bed-of-nails" testing apparatus.

SUMMARY OF THE INVENTION

The present invention is an apparatus for facilitating wave solder treatment and other handling of a circuit component during manufacture of the circuit component. The circuit component is preferably designed to have a plurality of first areas configured for wave solder treatment and a plurality of second areas not configured for wave solder treatment. In its preferred embodiment the apparatus comprises a substantially rigid frame. The frame is generally symmetrical about a plane and has a first side and a second side. The frame defines an opening which traverses the frame intermediate the first side and the second side. The apparatus further comprises a masking member affixed to the frame at the first side. The masking member defines a plurality of apertures traversing the masking member to the opening in the frame. The apparatus also comprises a holding means for holding the circuit component in an operational location in fixed relation with the masking member and with the frame during wave solder treatment. Each of the first areas of the circuit component is substantially in register with an aperture of the masking member when the circuit component is in the operational location.

In its most preferred embodiment, the masking member is removably affixed to the frame. Further, in the most preferred embodiment, the plurality of apertures is separated by a plurality of walls which have a height appropriate to affect flow of solder past the selected walls during wave solder treatment. Further, particular walls of the selected walls have a ramp having a ramp-expanse inclining in a first direction from an edge substantially bordering an adjacent aperture, the ramp-expanse terminating in the first direction at a ramp-length from the adjacent aperture, and the ramp-expanse spanning a ramp-width in a second direction. The ramp-width may be substantially constant across the ramp-length or may vary across the ramp-length.

It is, therefore, an object of the present invention to provide an apparatus for facilitating manufacturing processing, including wave solder treatment, of a circuit component which is configured to selectively affect the flow of solder past the circuit component during wave solder treatment.

It is a further object of the present invention to provide an apparatus for facilitating manufacturing processing, including wave solder treatment, of a circuit component which may be used with various manufacturing steps involving the circuit component.

Further objects and features of the present invention will be apparent from the following specification and claims when considered in connection with the accompanying drawings illustrating the preferred embodiment of the invention.

DETAILED DESCRIPTION OF THE INVENTION

Figure 1:
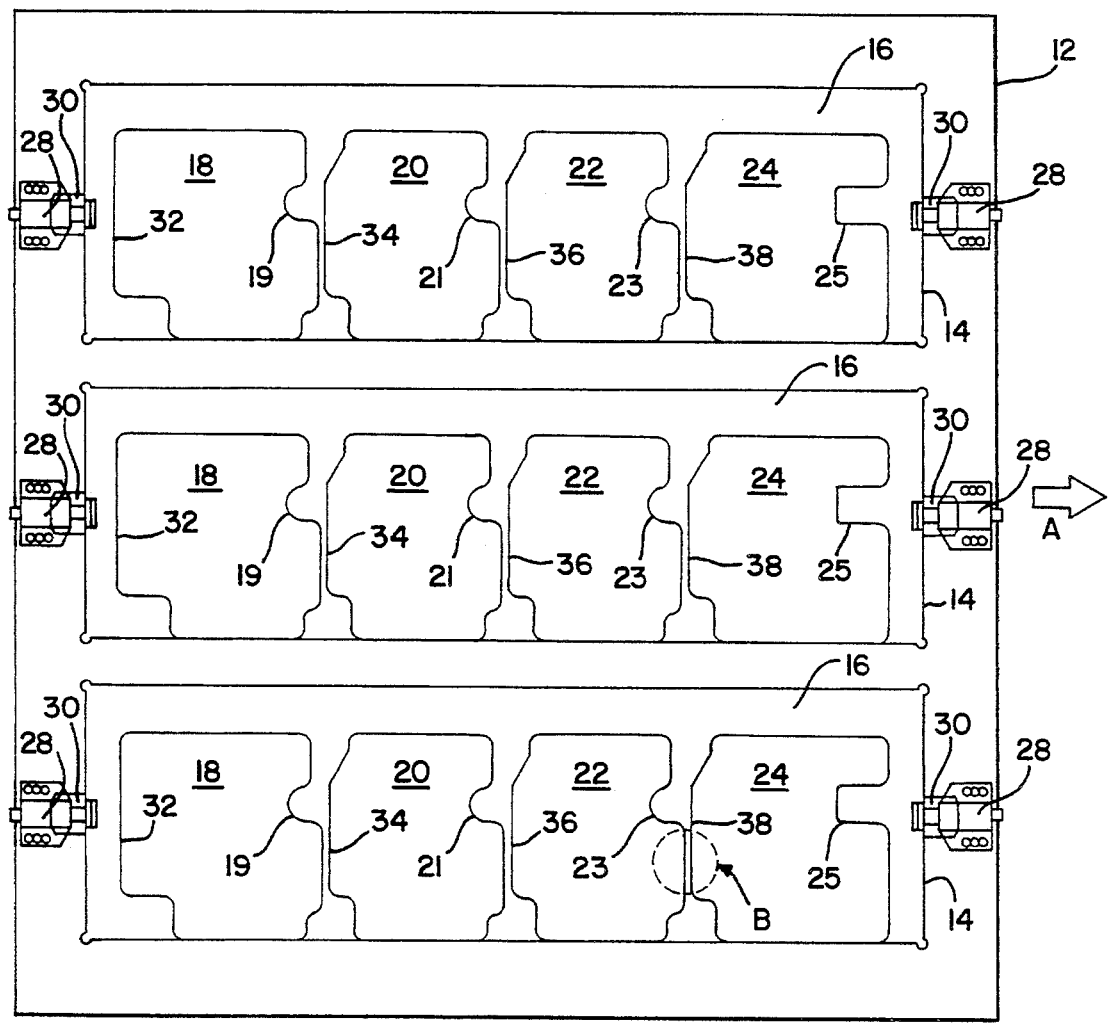
FIG. 1 is a plan view of the preferred embodiment of the present invention.

FIG. 1 is a plan view of the preferred embodiment of the present invention.

In FIG. 1, an apparatus 10 for facilitating wave solder treatment of a circuit component includes a frame 12 and a plurality of masking members 14. Each masking member 14 includes a peripheral structure 16 substantially surrounding and defining a plurality of apertures 18, 20, 22, 24. Thus, each aperture 18, 20, 22, 24 is substantially surrounded by defining walls. That is, aperture 18 is defined by a peripheral wall 19, aperture 20 is defined by a peripheral wall 21, aperture 22 is defined by a peripheral wall 23, and aperture 24 is defined by a peripheral wall 25. Frame 12 and the plurality of masking members 14 may be a single, unitary member or, as illustrated in FIG. 1, the plurality of masking members 14 may be removably affixed to frame 12.

In either embodiment (i.e., masking members 14 removably affixed to frame 12, or masking members 14 and frame 12 being a unitary structure) a plurality of holding devices 28 are provided for fixedly holding a circuit component (not shown in FIG. 1) with respect to masking members 14 and frame 12 for processing steps involved in manufacturing the circuit component. In its preferred embodiment illustrated in FIG. 1, each holding device 28 comprises a spring clip including a spring clip arm 30 so that a circuit component may be inserted intermediate spring clip arm 30 and frame 12 to retain the circuit component in fixed relation with respect to frame 12 and with respect to masking members 14.

Masking members 14 are configured to mask, or preclude, solder adhesion with a circuit component held in place with respect to frame 12 by holding devices 28. Such interference with solder adhesion is effected by peripheral structures 16. That is, a particular peripheral structure 16 is designed for each circuit component (not shown) which is to be processed using the apparatus 10 of the present invention. Thus, predetermined portions of the circuit component being processed are exposed to solder via apertures 24 during wave solder treatment, and therefore experience solder adhesion in a manner known to those skilled in the art of circuit component processing.

Of particular interest in the present invention is the portion of peripheral structure 16 laterally adjacent each respective aperture 24. That is, in FIG. 1, wall segments 32, 34, 36, 38. Wall segments 32, 34, 36, 38 extend in a plane substantially perpendicular with the plane of apparatus 10 in FIG. 1 to a height which is preferably sufficient to affect the flow of solder with respect to apparatus 10 (and, thus, with respect to the circuit component affixed with respect to FIG. 10 by way of holding devices 28) as apparatus 10 and its affixed circuit component are moved through a wave solder reservoir (not shown in FIG. 1) in the direction indicated by arrow "A" in FIG. 1. That is, wall segments 32, 34, 36, 38 have a damming effect on the flow of solder with respect to a circuit component affixed with apparatus 10 so that the areas of the circuit component generally adjacent respective wall segments 32, 34, 36, 38 will experience a deeper solder flow. Thus, more solder will be applied in those adjacent areas during wave solder treatment because of the damming effect by the respective wall segments 32, 34, 36, 38.

Altering the height or otherwise altering the profile of a wall segment 32, 34, 36, 38 will affect solder flow in the vicinity of the alteration. One may alter a wall segment 32, 34, 36, 38 to achieve a desired flow of solder across an aperture 18, 20, 22, 24 by appropriately choosing the profile of the alteration.

In order to facilitate understanding of the present invention, like elements will be referred to using like reference numerals in the various drawings.

FIG. 2 illustrates representative alternate embodiments of details of ramps which may be employed with selected wall segments of the present invention, such as in area "B" illustrated in FIG. 1.

In FIG. 2, views (a), (b) and (c) illustrate various embodiments of wall profiles which may be employed to predictably channel or predictably alter solder flow during wave solder treatment using the present invention illustrated in FIG. 1.

Figure 2A:
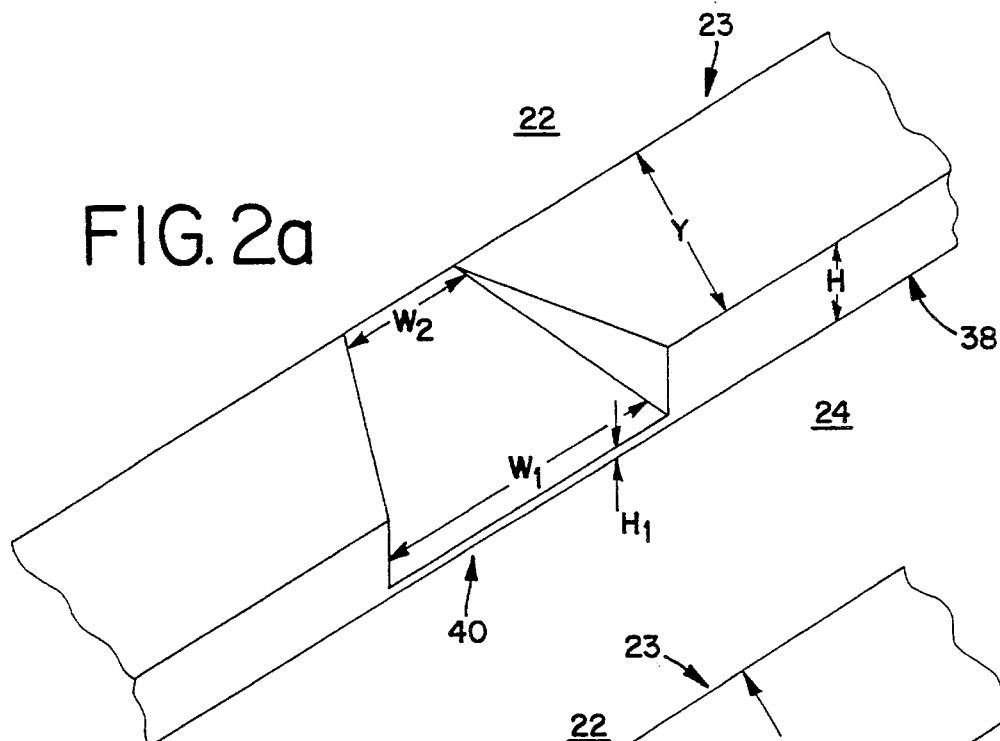
FIG. 2 illustrates representative alternate embodiments of details of ramps which may be employed with selected wall segments of the present invention, such as in area "B" illustrated in FIG. 1.

Thus, in FIG. 2(a) a wall segment 38 is illustrated having a height H. Wall segment 38 has a lateral dimension Y extending to wall 23 adjacent aperture 22 (see FIG. 1). Wall segment 38 includes a ramp 40. Ramp 40 has a ramp-expanse measured as a ramp-width which varies from a first ramp-width $W_1$ adjacent wall segment 38 at a portion providing a reduced height $H_1$, to a second ramp-width $W_2$ smaller than ramp-width $W_1$ and adjacent wall 23. Thus, ramp 40 extends a ramp-length substantially extending lateral dimension Y.

Figure 2B:
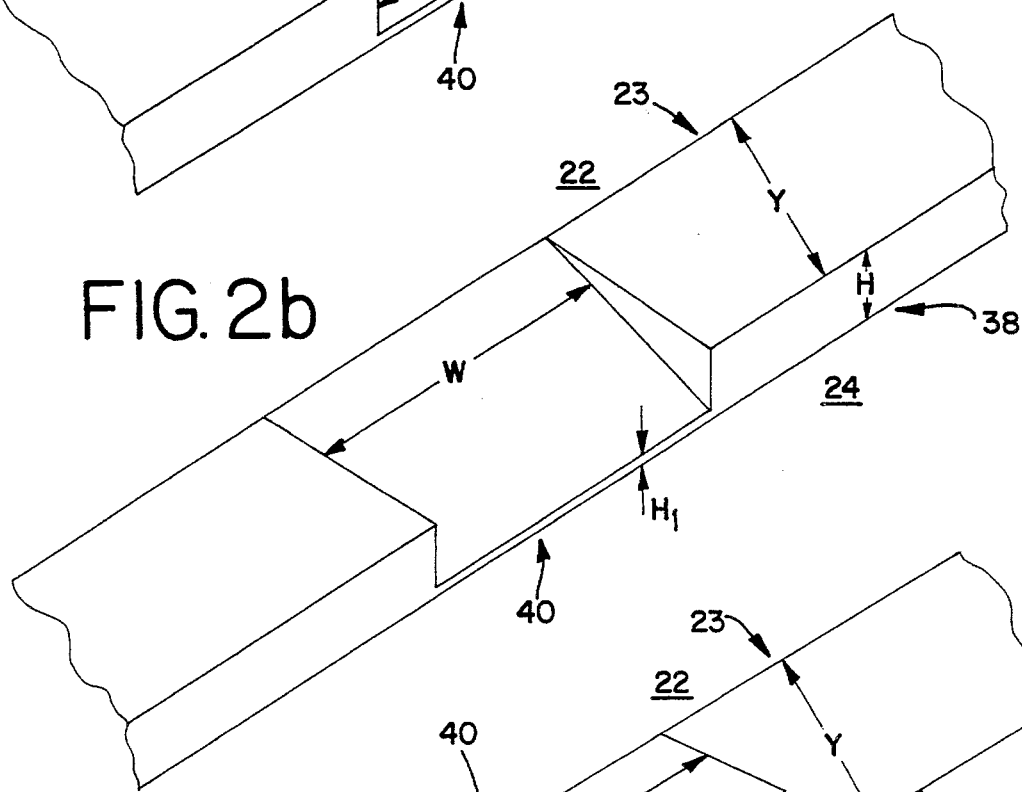

In FIG. 2(b) a similar arrangement is illustrated having a wall segment 38 having a height H and having a lateral dimension Y extending substantially to wall 23 adjacent aperture 22. A reduced height $H_1$ is provided to define a lower edge of a ramp 40. Ramp 40 has a consistent ramp-width W substantially across lateral dimension Y and terminates substantially adjacent wall 23 and aperture 22.

Figure 2C:
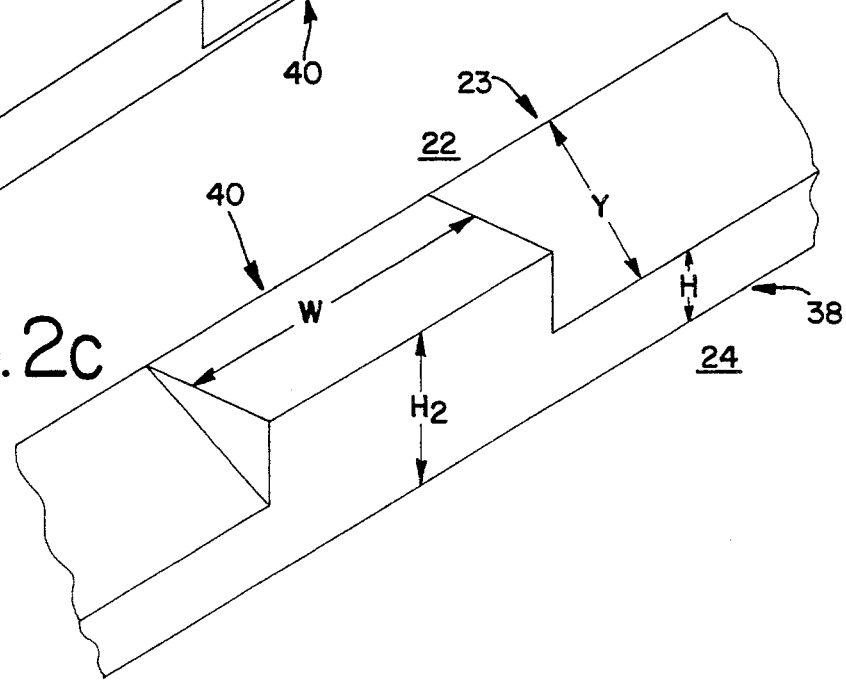

FIG. 2(c) illustrates a third embodiment of a ramp arrangement. In FIG. 2(c), a wall segment 38 having a height H and a lateral dimension Y is illustrated having a ramp 40 adjoining aperture 24 in a height $H_2$ which is greater than height H. Ramp 40 has a ramp-width W which is substantially constant across lateral dimension Y and terminates substantially adjacent wall 23 and aperture 22.

The various embodiments illustrated in FIGS. 2 are representative of a variety of possible wall configurations which may be chosen to affect solder flow past wall segment 38 to achieve a desired wave solder result.

In the most preferred embodiment of the present invention, holding devices 28 retain circuit components sufficiently rigidly and predictably with respect to frame 12 and with respect to masking members 14 to accommodate transportation of the circuit components through various manufacturing processing steps, including testing apparatus such as "bed-of-nails" test fixtures, without requiring realignment or refixturing of circuit components. By avoiding handling which would be required for re-fixturing circuit components for various processing steps significant savings in labor costs may be achieved.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

I claim:

1. An apparatus for facilitating wave solder treatment of a circuit component, said circuit component having a plurality of first areas and a plurality of second areas; said plurality of first areas being configured for said wave solder treatment, said plurality of second areas not being configured for said wave solder treatment; the apparatus comprising:

a frame; said frame being substantially rigid and generally symmetrical about a plane; said frame having a first side and a second side and defining an opening traversing said frame intermediate said first side and said second side;

a masking member; said masking member being affixed to said frame at said first side and defining a plurality of apertures; each respective aperture of said plurality of apertures traversing said masking member to said opening; and holding means for holding said circuit component in an operational location in a fixed relation with said masking member and with said frame during said wave solder treatment; each said first area of said plurality of first areas being substantially in register with one aperture of said plurality of apertures when said circuit component is in said operational location; said plurality of apertures being separated by a plurality of walls, selected walls of said plurality of walls having a height appropriate to affect flow of solder past said selected walls during said wave solder treatment.

2. An apparatus for facilitating wave solder treatment of a circuit component as recited in claim 1 wherein said masking member is removably affixed to said frame.

3. An apparatus for facilitating wave solder treatment of a circuit component as recited in claim 1 wherein particular walls of said selected walls have a ramp, each said ramp having a ramp-expanse inclining in a first direction from an edge substantially bordering an adjacent aperture of said plurality of apertures, said ramp-expanse terminating in said first direction a ramp-length from said adjacent aperture; said ramp spanning a ramp-width in a second direction.

4. An apparatus for facilitating wave solder treatment of a circuit component as recited in claim 3 wherein said ramp-width is substantially constant across said ramp-length.

5. An apparatus for facilitating wave solder treatment of a circuit component as recited in claim 3 wherein said ramp-width varies across said ramp-length.

6. An apparatus for facilitating wave solder treatment of a circuit component as recited in claim 2 wherein said plurality of apertures are separated by a plurality of walls, selected walls of said plurality of walls having a height appropriate to affect flow of solder past said selected walls during said wave solder treatment.

7. An apparatus for facilitating wave solder treatment of a circuit component as recited in claim 6 wherein particular walls of said selected walls have a ramp, each said ramp having a ramp-expanse inclining in a first direction from an edge substantially bordering an adjacent aperture of said plurality of apertures, said ramp-expanse terminating in said first direction a ramp-length from said adjacent aperture; said ramp spanning a ramp-width in a second direction.

8. An apparatus for facilitating wave solder treatment of a circuit component as recited in claim 7 wherein said ramp-width is substantially constant across said ramp-length.

9. An apparatus for facilitating wave solder treatment of a circuit component as recited in claim 7 wherein said ramp-width varies across said ramp-length.

10. An apparatus for facilitating wave solder treatment of a circuit component, said circuit component having a plurality of first areas configured for said wave solder treatment and a plurality of second areas not configured for said wave solder treatment; the apparatus comprising:

a masking means; said masking means being substantially rigid and generally symmetrical about a plane; said masking means having a first side and a second side and defining at least one aperture traversing said masking means intermediate said first side and said second side; and holding means for holding said circuit component in an operational location in a fixed relation with said masking means during said wave solder treatment; each said first area of said plurality of first areas being substantially in register with one aperture of said at least one aperture when said circuit component is in said operational location; said at least one aperture being bounded by a plurality of walls, selected walls of said plurality of walls having a height appropriate to affect flow of solder past said selected walls during said wave solder treatment.

11. An apparatus for facilitating wave solder treatment of a circuit component as recited in claim 10 wherein said masking means is removably affixed to a frame.

12. An apparatus for facilitating wave solder treatment of a circuit component as recited in claim 10 wherein particular walls of said selected walls have a ramp, each said ramp having a ramp-expanse inclining in a first direction from an edge substantially bordering an adjacent aperture of said at least one aperture, said ramp-expanse terminating in said first direction a ramp-length from said adjacent aperture; said ramp spanning a ramp-width in a second direction.

13. An apparatus for facilitating wave solder treatment of a circuit component as recited in claim 12 wherein said ramp-width is substantially constant across said ramp-length.

14. An apparatus for facilitating wave solder treatment of a circuit component as recited in claim 12 wherein said ramp-width varies across said ramp-length.

15. An apparatus for facilitating wave solder treatment of a circuit component as recited in claim 11 wherein said at least one aperture is bounded by a plurality of walls, selected walls of said plurality of walls having a height appropriate to affect flow of solder past said selected walls during said wave solder treatment.

16. An apparatus for facilitating wave solder treatment of a circuit component as recited in claim 15 wherein particular walls of said selected walls have a ramp, each said ramp having a ramp-expanse inclining in a first direction from an edge substantially bordering an adjacent aperture of said at least one aperture, said ramp-expanse terminating in said first direction a ramp-length from said adjacent aperture; said ramp spanning a ramp-width in a second direction.

17. An apparatus for facilitating wave solder treatment of a circuit component as recited in claim 16 wherein said ramp-width is substantially constant across said ramp-length.

18. An apparatus for facilitating wave solder treatment of a circuit component as recited in claim 16 wherein said ramp-width varies across said ramp-length.

\* \* \* \* \*